United States Patent
Depestel et al.

(10) Patent No.: US 9,668,421 B2
(45) Date of Patent: Jun. 6, 2017

(54) DETECTION DEVICE FOR DETECTION OF A FOREIGN OBJECT FOR AN AGRICULTURAL HARVESTING MACHINE

(71) Applicant: CNH America LLC, New Holland, PA (US)

(72) Inventors: Bernard E. D. Depestel, Oedelem (BE); Dirk J. Desnijder, Wondelgem (BE); Bart M. A. Missotten, Winksele (BE); Benoit Debilde, Bruges (BE); Karel M. C. Viaene, Ghent (BE)

(73) Assignee: CNH Industrial America LLC, New Holland, PA (US)

( * ) Notice: Subject to any disclaimer, the term of this patent is extended or adjusted under 35 U.S.C. 154(b) by 313 days.

(21) Appl. No.: 14/157,223

(22) Filed: Jan. 16, 2014

(65) Prior Publication Data

US 2014/0202126 A1    Jul. 24, 2014

(30) Foreign Application Priority Data

Jan. 18, 2013 (BE) .................................. 2013/0035

(51) Int. Cl.
*A01D 75/18* (2006.01)

(52) U.S. Cl.
CPC .......... *A01D 75/18* (2013.01); *A01D 75/187* (2013.01)

(58) Field of Classification Search
CPC .............................. A01D 75/187; A01D 75/18
USPC ................. 56/10.2 R, 10.4, 10.2 J; 460/2, 3; 73/579
See application file for complete search history.

(56) References Cited

U.S. PATENT DOCUMENTS

| | | | |
|---|---|---|---|
| 3,559,805 A | | 2/1971 | Cragg |
| 4,275,546 A | * | 6/1981 | Bohman ............ A01D 75/187 460/2 |
| 4,353,199 A | | 10/1982 | Chow et al. |
| 4,464,935 A | * | 8/1984 | McHugh .............. G01H 1/003 324/207.24 |
| 4,720,963 A | | 1/1988 | Weiss et al. |
| 5,078,645 A | | 1/1992 | Bohman et al. |
| 5,092,818 A | | 3/1992 | Bohman et al. |
| 6,318,056 B1 | | 11/2001 | Rauch et al. |
| 6,324,822 B1 | | 12/2001 | Oliva |
| 6,601,372 B1 | * | 8/2003 | Heinsey ................. A01F 12/16 56/10.2 J |
| 7,415,365 B2 | * | 8/2008 | Jeppe ................ A01D 41/1273 56/10.2 C |

(Continued)

FOREIGN PATENT DOCUMENTS

| | | |
|---|---|---|
| DE | 102004035928 | 3/2003 |
| DE | 102006033100 A1 | 1/2007 |

(Continued)

OTHER PUBLICATIONS

Opposition by Deere & Co. against EP2756748B1, filed May 18, 2016, 5 pages.

(Continued)

*Primary Examiner* — John G Weiss
(74) *Attorney, Agent, or Firm* — Peter K. Zacharias; Patrick M. Sheldrake

(57) ABSTRACT

A vibration sensor is mounted on the central shaft, such that it senses vibrations induced into the feed roll assembly in a direction transverse to the rotational axis of the feed roll.

18 Claims, 6 Drawing Sheets

(56) References Cited

U.S. PATENT DOCUMENTS

| | | | |
|---|---|---|---|
| 7,520,111 B2* | 4/2009 | Berger | A01F 12/16 56/10.2 J |
| 7,584,663 B2* | 9/2009 | Missotten | A01D 41/1273 209/599 |
| 2002/0091476 A1 | 7/2002 | Beck | |
| 2003/0115846 A1 | 6/2003 | Duncan | |
| 2006/0277882 A1 | 12/2006 | Berger et al. | |
| 2006/0277883 A1* | 12/2006 | Berger | A01D 75/187 56/10.2 J |
| 2007/0277491 A1* | 12/2007 | Byttebier | B60Q 1/50 56/10.2 J |
| 2014/0090472 A1* | 4/2014 | Lysen | G01H 1/003 73/587 |

FOREIGN PATENT DOCUMENTS

| | | |
|---|---|---|
| DE | 102008054488 A1 | 6/2010 |
| DE | 102009000351 A1 | 7/2010 |
| EP | 0152291 | 8/1985 |
| EP | 2514299 A1 | 10/2012 |

OTHER PUBLICATIONS

Reply by CNH Industrial Belgium nv in Opposition against EP2756748B1, filed Nov. 7, 2016, 9 pages.

* cited by examiner

DETECTION DEVICE FOR DETECTION OF A FOREIGN OBJECT FOR AN AGRICULTURAL HARVESTING MACHINE

CROSS REFERENCE TO RELATED APPLICATIONS

This patent application claims priority under 35 U.S.C. §119 to BE 2013/0035 filed on Jan. 18, 2013 titled, "A Detection Device for Detection of a Foreign Object for an Agricultural Harvesting Machine". The full disclosure of BE 2013/0035 is hereby fully incorporated herein by reference.

FIELD OF THE INVENTION

The present invention generally relates to a detection device for detection of a foreign object for an agricultural harvesting machine. More specifically such a detection device that is able to detect non-magnetic foreign objects comprising a feed roll assembly for a forage harvester or a combine harvester.

BACKGROUND OF THE INVENTION

In order to avoid damage to the harvesting machine or spoilage of the harvested material by foreign objects such as stones or other hard objects in the crop flow it is known to provide a harvesting machine with a foreign object detection device so that the harvesting machine upon detection of such a device can automatically take the required actions to avoid the foreign object to be processed along with the crop material. Detection devices that detect foreign objects based on the effects they cause on a feeder assembly of a harvester have the advantage that upon detection near the feeder assembly the crop flow can be interrupted before the foreign object is further processed along with the crop material by the harvesting machine. However in order to successfully avoid processing of the foreign object the detection of it must occur as quickly as possible, as with harvesting machines with increasing productivity the time available for interrupting the crop flow in the feeder assembly before reaching subsequent processing elements is constantly decreased. Furthermore the detection device must operate as reliable as possible being able to detect an as wide range of foreign objects as possible while avoiding false detections interrupting the harvesting operation unnecessarily.

One such a detection device known from US2003/0115846. There the acceleration of the top rolls of the feeder assembly as a consequence of a foreign object in the crop flow is monitored. However because of the large inertia associated with this acceleration of the top rolls, the detection lags the occurrence of a foreign object considerably and only foreign objects that are large enough to cause a movement are detected. Furthermore lumps of crop material could equally cause similar accelerations top rolls leading to false detections.

U.S. Pat. No. 5,092,818 describes a detection device that acoustically detects airborne noise generated by an impact of a foreign object on the feed roll by means of a microphone. However because of the noise generated by several elements of the harvesting machine in operation the microphone needs to be arranged in close vicinity of the impact location and be provided with acoustical isolators. In practice reliable detection is difficult and extensive filtering of the signal is required which leads to detection lags.

It is further known from U.S. Pat. No. 4,353,199 to arrange a piezoelectric sensor on the feed roll itself. However the inductive transmission needed for the sensor signal from the sensor that is rotating with the feed roll during operation to a stationary cable by means of an inductive coupling leads to serious degradation of the signal quality and the risk of inducing disturbances to the signal. Furthermore this system also requires acoustic isolation by means of shock mounts at the height of the bearings of the feed roll on the central shaft. With heavily loaded feed rolls shock mounts at this location affect the stability of the feed roll assembly.

Still a further system is known from DE102008054488. This system proposes to arrange a piezoelectric vibration sensor on the central shaft of the feed roll such that it detects vibrations along the rotational axis of this central shaft. The subsequent processing requires filtering operations that induce detection lags which become critical for high capacity harvesting machines.

Therefor there exists a need for an improved detection device that overcomes the abovementioned disadvantages, increasing the reliability of detection of a foreign object while decreasing the detection lag, without requiring acoustic isolation.

SUMMARY OF THE INVENTION

According to the invention there is provided a detection device for detection of a foreign object in an agricultural harvesting machine, the harvesting machine comprising a feed roll assembly with a central shaft and a feed roll rotatably mounted around the central shaft, the central shaft and the feed roll comprising a common rotational axis.

The detection device comprises at least one vibration sensor and a control system. The vibration sensor is mounted on the central shaft such that it can sense vibrations induced into the feed roll assembly. The control system is operatively coupled to the vibration sensor and is configured to analyze a signal generated by the vibration sensor and to, based on said analysis, detect whether the foreign object has collided with the feed roller. The vibration sensor is mounted such that it senses vibrations induced into the feed roll assembly in a direction transverse to the common rotational axis.

In this way the vibration sensed as a result of the impact of a foreign object and the signal generated by the vibration sensor is maximized, with minimal impact on the constructional properties of the feed roll assembly. This enables a reliable detection without the need for acoustical isolation and it allows detecting also the impacts of smaller foreign objects reliably.

According to an embodiment of the invention the central shaft comprises near its axial extremities two supports for mounting the feed roll assembly to the harvesting machine, and at least one vibration sensor is mounted on the central shaft in between the two supports. This allows for a simple mounting of the vibration sensor.

Preferably the vibration sensor is mounted on the central shaft and inside the feed roll. This shields it from moisture and dust.

According to a preferred embodiment the control system is further configured to:
analyze the signal generated by the vibration sensor by:
generate a sampled signal by sampling the signal generated by the vibration sensor at a predetermined sample rate;
calculate a squared sampled signal as the square of the sampled signal;
calculate a summed, squared sampled signal as the sum of a predetermined number of consecutive samples of the squared sampled signal; and to generate a detection signal when the summed, squared sampled signal exceeds the predetermined threshold in order to detect a collision of the foreign object.

This allows detection of the impact with an increased reliability and decreased detection lag because no extensive filtering of the sensor signal is required.

Preferably the predetermined sample rate and the predetermined number of consecutive samples are related to a predetermined maximum delay for detection, in such a way that a quotient of the predetermined number of consecutive samples and the predetermined sample rate substantially corresponds to the predetermined maximum delay for detection.

In this way a reliable detection is possible before the foreign object is processed by the harvesting machine.

Preferably the sampling rate and the predetermined number of consecutive samples are determined such that a summed, squared sampled signal generated by the collision of the foreign object is maximized.

According to a specific embodiment the predetermined number of consecutive samples is equal to about the main frequency component of the signal generated by the collision of the foreign object divided by the predetermined sampling rate.

According to still a further embodiment the control system is further configured to receive an operating parameter of the harvesting machine; and the predetermined threshold is determined in function of the operating parameter of the harvesting machine. The operating parameter of the harvesting machine is one or more of the following: rotational speed of the feed roll, type of crop being harvested, installed components on the harvesting machine, such as for example, the type of header used, the number and type of knives installed on the cutter drum of a forage harvester, and/or cutting length for the crop when harvested by a forage harvester.

This allows for a reliable detection in a variety of harvesting conditions.

According to a specific embodiment the detection device comprises the at least one sensor being mounted on the feed roll comprising a piezoelectric vibration sensor, the control system comprising a first part being mounted on the feed roll and comprising, a wireless transmitter configured to transmit a wireless signal generated by the control system on the basis of the signal generated by the vibration sensor and a local power source for providing power to the wireless transmitter, and the control system further comprising a second part being mounted on the central shaft comprising a wireless receiver configured to receive the wireless signal.

The local power source allows for local processing of the vibration sensor signal rotating on the feed roll, which subsequently allows to transmit a digital signal wirelessly without an increase in detection lag, nor the risk of sensor signal degradation.

Preferably the wireless signal is only generated when the control system detects the collision of the foreign object. This optimizes power consumption of the local power source.

According to a further embodiment the local power source is a rechargeable power source and is configured to be recharged by means a recharging means providing an inductive power coupling between the first part and the second part of the control system.

This further increases the long-term performance of the local power source.

According to a second aspect of the invention, there is provided a method for detecting a foreign object with a detection device according to the first aspect of the invention, characterized in that it comprises the steps of:
   analyzing the signal generated by the vibration sensor by:
   determining a predetermined threshold;
   generating a sampled signal by sampling the signal generated by the vibration sensor at a predetermined sample rate;
   calculating a squared sampled signal as the square of the sampled signal;
   calculating a summed, squared sampled signal as the sum of a predetermined number consecutive samples of the squared sampled signal; and
   generating a detection signal when the summed, squared sampled signal exceeds the predetermined threshold in order to detect the collision of the foreign object.

DETAILED DESCRIPTION OF EMBODIMENT(S)

Figure 1:
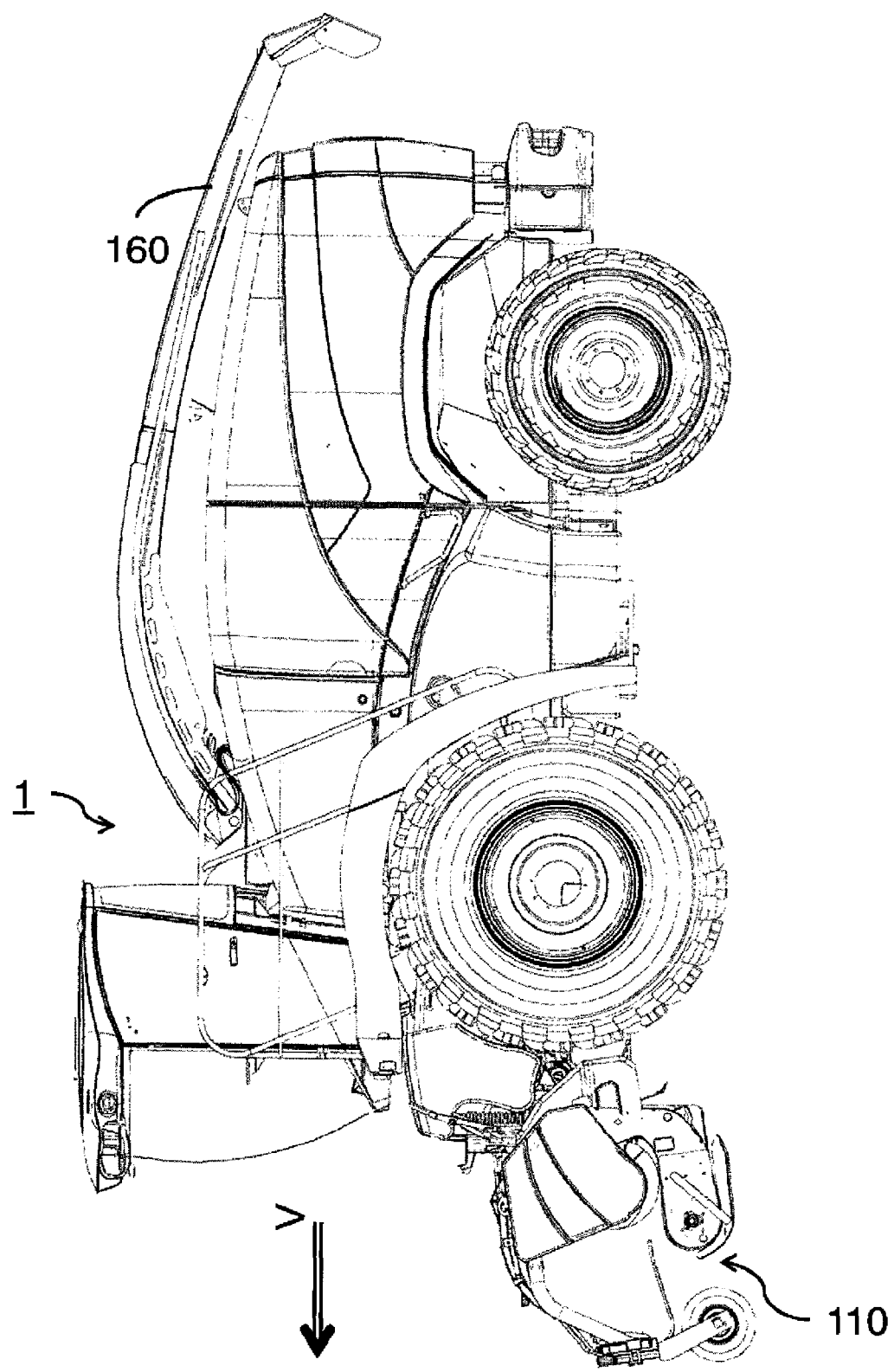
FIG. 1 illustrates an agricultural harvesting machine comprising a feed roll with a detection device according to the invention.
Figure 2:
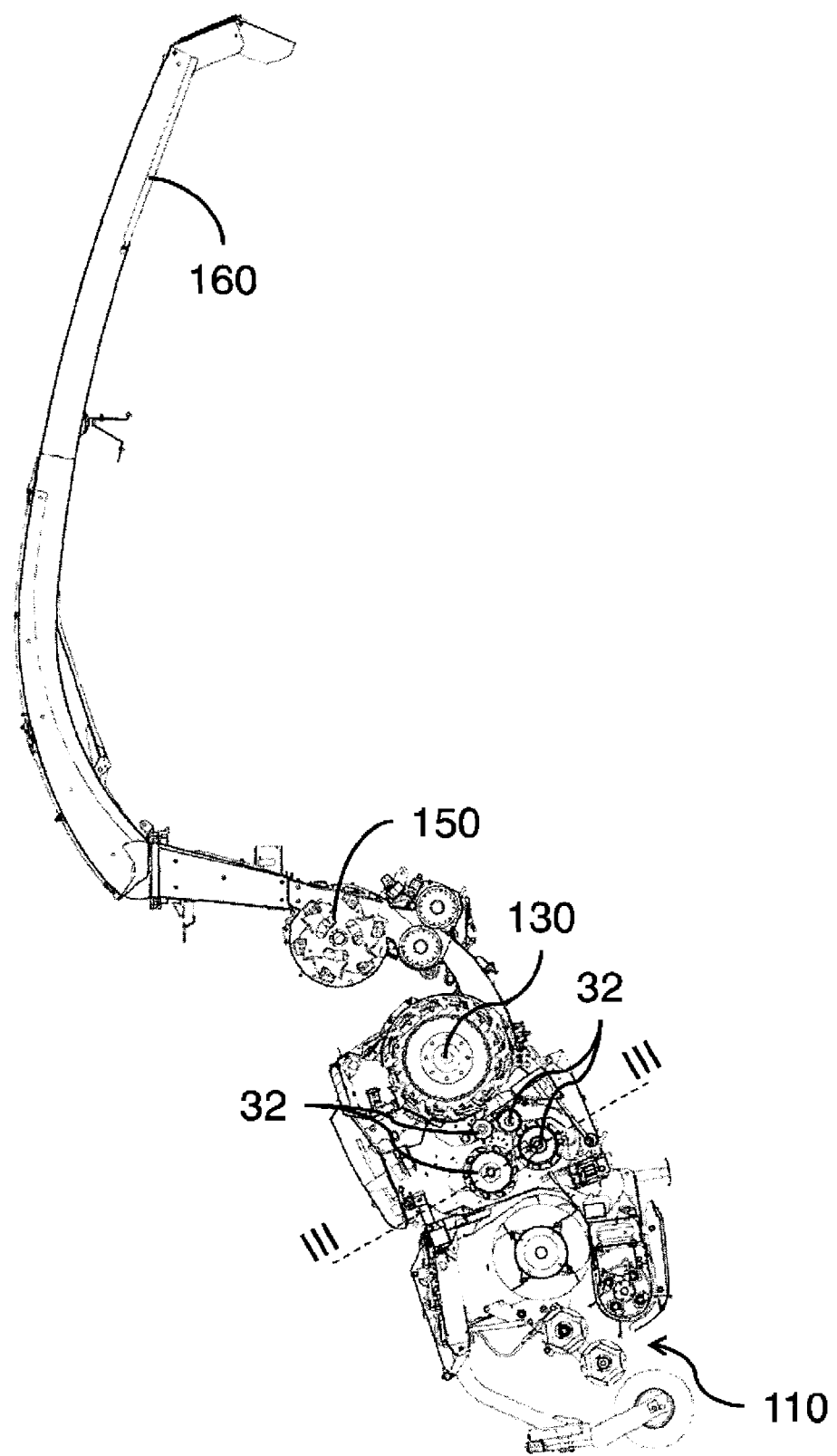
FIG. 2 shows selected elements of the agricultural harvesting machine of FIG. 1.

FIGS. 1 and 2 schematically show a forage harvester 1 comprising a detection device according to the invention. During a harvesting operation the forage harvester 1 travels along a direction V along a field and picks up crop, such as for example grass, by means of a pick-up mechanism 110. The crop is subsequently transported to a feeder which comprises a plurality of feeder rolls 32 which are driven to transport the crop at a controlled rate to the cutter drum 130 which cooperates with a fixed knife in order to chop the crop in pieces of a predetermined length. Subsequently the crop is propelled by means of a fan element 150 towards a spout 160 for directing it into a suitable reservoir such as a cart pulled by a tractor for further transportation to a storage location. The detection device according to the invention is mounted into a feed roll assembly 30 which comprises a feed roll 32 of the feeder. For the forage harvester shown in FIG. 1, preferably the lower front feed roll 32 is chosen as this is the feed roll that is most likely to come into contact with a foreign object when crop material is being harvested. It is clear that the detection device could also be used in combination with alternative mechanisms for taking up crop. For example maize headers, grain headers, etc. could be attached to the forage harvester 1 and other types of harvesters such as for example combine harvesters, pull type forage harvesters, etc.

Figure 3:
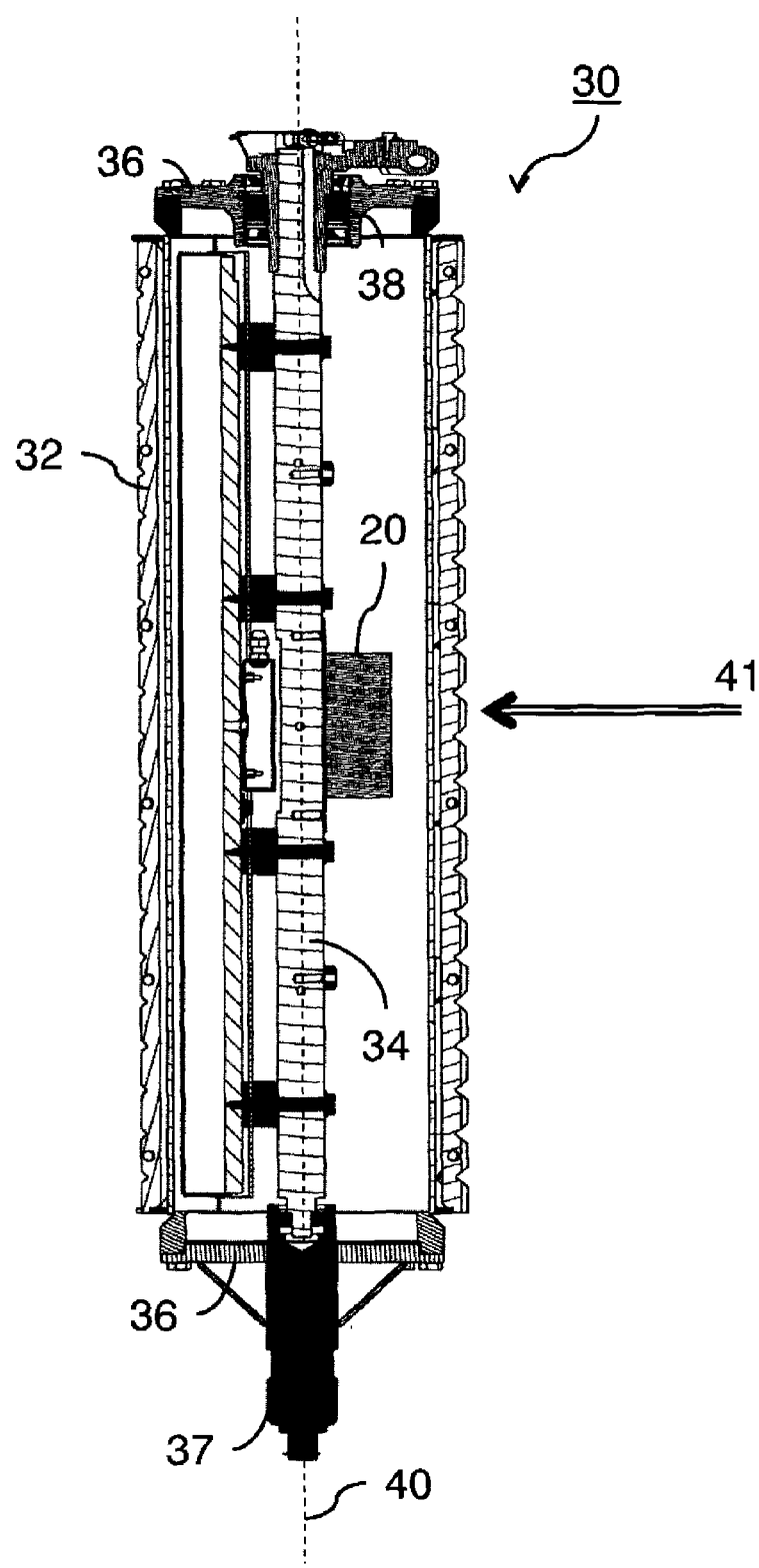
FIG. 3 shows a sectional view according to the line III-III in FIG. 2, of a feed roll assembly comprising a detection device according to the invention.

FIG. 3 shows a sectional view according to the line III-III in FIG. 2 of the detection device for detection of a foreign object for an agricultural harvesting machine 1 in more detail. The detection device comprises the feed roll assembly 30, which comprises a central shaft 34. Around this central shaft 34 a feed roll 32 is rotatably mounted. According to the embodiment shown the feed roll 32 is mounted to the central shaft 34 by means of suitable flanges 36 at both opposite sides of the feed roll 32 which are connected to suitable bearings 38 which rotatably connect these flanges to the central shaft 34. The rotational axes of these bearings 38 are aligned and coincide with the rotational axis 40 of the feed roll 32. It is further clear that in this way the rotational axis of the feed roll 32 is substantially parallel to the longitudinal axis of the central shaft 34. At least one of these flanges 36 is provided with suitable means 37 for coupling the flange 36 to a drive system, which when mounted into an agricultural vehicle can rotatably drive the feed roll 32 around the central shaft 34, this central shaft then at both longitudinal ends being supported on the frame of the agricultural harvester 1 by means of suitable supports. It can further be seen that the detection device comprises at least one vibration sensor 20. In the embodiment shown in FIG. 5, three such vibration sensors 20 are mounted on the feed roll assembly 30 such that it can sense vibrations induced into the feed roll assembly 30, especially vibrations generated by impact of a foreign object, such as for example a stone, on the feed roll assembly 30. Such vibration sensor 20 could for example be a piezoelectric vibration sensor or any other type of suitable directional vibration sensor. As can be seen the vibration sensors 20 are mounted on the central shaft 34. According to an alternative embodiment, the vibration sensors 20 could be mounted both on the feed roll 32 and the central shaft 34. It is not required to mount a plurality of vibration sensors 20, according to some embodiments a single vibration sensor 20 could suffice. The feed roll 32 according to this embodiment is formed by a substantially cylindrical, metal plate, which is provided with longitudinal slats 33 in order to increase friction on the crop material. The feed roll 32 could be for example manufactured from stainless steel. Equally also the other elements of the feed roll assembly 30 may be manufactured from a suitable metal such as stainless steel.

Figure 5:
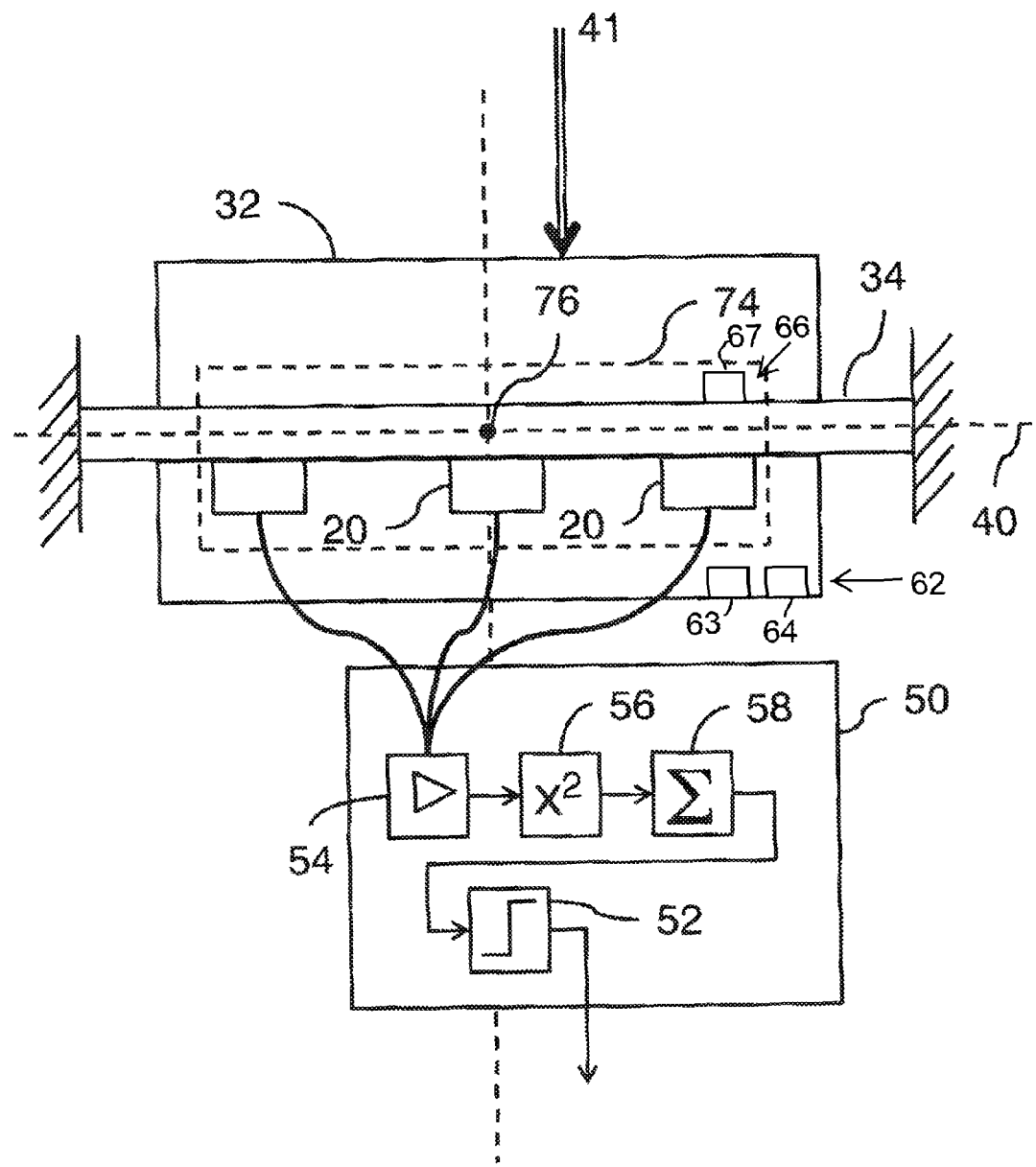
FIG. 5 schematically illustrates the setup of the vibration sensor and the signal analysis by the control system of the detection device according to the invention.

When a foreign object, such as for example a stone, impacts on the feed roll 32 the impact force will cause vibrations into the feed roll 32. Such a foreign object is normally transported along the direction of the crop flow and thus the most likely direction of the impact is along this crop flow direction which is substantially aligned with a direction 41 transverse to the rotational axis 40 of the feed roll 32. The impulse of the impact of the foreign object on the feed roll 32 will result in a temporary deflection of the surface of the feed roll 32 substantially along the direction of the impact force. This will then be the cause of structure borne vibrations in the feed roll 32 and also in the central shaft 34 as the impact force and the resulting structure borne vibrations will also act on the central shaft 34 via the flanges 36 and the bearings 38. The amount of deflection of the feed roll 32 or the central shaft 34 depends, amongst other things, on the stiffness of the structure, the direction of the impact force, the location of the impact force. It was found that the deflection of the feed roll 32 or the central shaft 34 along the transverse direction 41 is larger than that along the longitudinal direction which is substantially aligned with the rotational axis 40. Therefor according to the invention the vibration sensors 20 are mounted such that they sense vibrations induced into the feed roll assembly 30 in the direction 41 transverse to the rotational axis 40 of said feed roll 32. In this way the vibrations, which correspond to the largest deflections will result in the largest accelerations that are measured by the vibration sensor 20 in order to provide a clear signal for the detection of an impact. Although an impact will also generate longitudinal deflections in the feed roll 32 and the central shaft 34, because of the larger longitudinal stiffness of these structures the amount of deflection generated will be lower, as will be the corresponding accelerations and vibrations detectable by a vibration sensor 20. As schematically shown in FIG. 5 the signal generated by the vibration sensors 20 is subsequently processed by a control system 50 which is coupled to these vibration sensors 20. The control system 50 then analyses the signal generated by said vibration sensor 20 in order to detect whether a foreign object has collided with said feed roller 32. Although prior art signal processing could be used in which for example the signal is compared to a threshold, optionally being pre-processed by suitable filtering, an improved configuration of the control system in order to process the signal more reliable in order to avoid false detections and faster in order to be able to intervene in the machine operation quick enough to avoid damage will be described further below.

Figure 4:
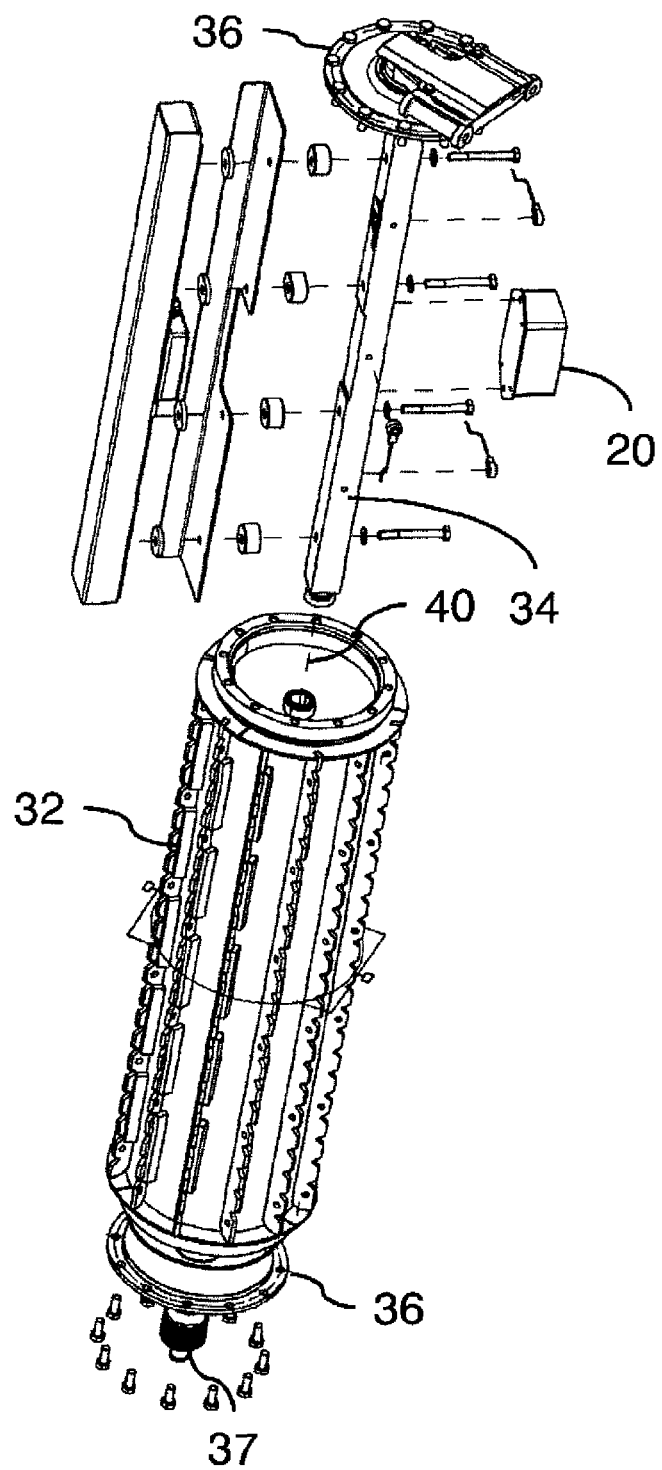
FIG. 4 shows an exploded view of the feed roll assembly of FIG. 3.

As shown in FIGS. 3 and 4 the vibration sensor 20 is preferably mounted inside the feed roll 32 so that it is shielded from for example moisture and dust generated by the harvesting process. Furthermore in this way the vibration sensor 20 is mounted close to the source of the vibrations generated by an impact of a foreign object on the feed roll 32. The deflection along the transverse direction during the vibrations generated by an impact on the feed roll 32 will become smaller for locations on the feed roll assembly 30 closer to the supports for mounting said feed roll assembly 30 to said harvesting machine 1 near the axial extremities of the central shaft 34. Therefore, according to the embodiment shown in FIGS. 2-5, the vibration sensors 20 that are mounted on the central shaft 34 in between these supports, are preferably mounted in an axial mounting zone 74 comprising the center 76 between these supports. Generally, this axial mounting zone 74 extends axially over a distance smaller than the distance between these two supports, however according to a specific embodiment it could be a relatively small zone around the center 76 between both supports where the transverse deflection of the feeder roll 32 or the central shaft is likely to be sufficiently large for detection by a vibration sensor 20.

Figure 6:
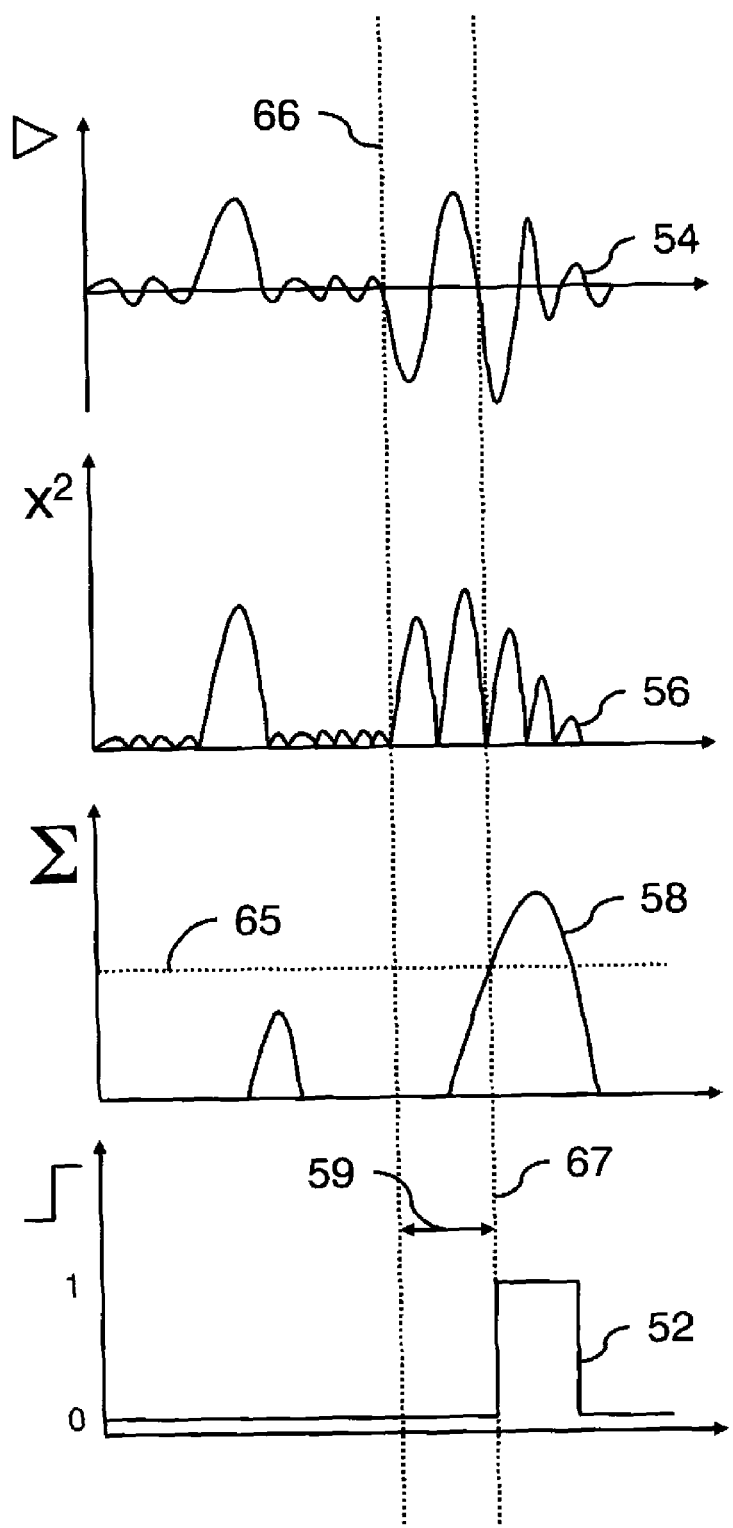
FIG. 6 graphically shows the different steps of the signal analysis for a signal generated by the vibration sensor during which an impact of a foreign object occurs.

As schematically shown in FIG. 5 and the corresponding signals in FIG. 6 the control system 50 in general is configured to analyze the signal generated by the one or more vibration sensors 20 by sampling 54 this signal at a predetermined sample rate, calculating the square 56 of this sampled signal and subsequently integrating the squared signal 56 or calculating the sum 58 of a predetermined number consecutive samples of said squared sampled signal 56. The collision of the foreign object is then detected when the summed, squared sampled signal 58 exceeds a predetermined threshold 65. As represented with the detection signal 52 in FIG. 6. According to a particularly simple embodiment this predetermined threshold could for example be a factory set parameter. When using the signal analysis described above, the detection delay 59 between the impact occurring and the impact being detected is determined by the predetermined sample rate and the predetermined number of consecutive samples of which the squared value is summed. If for example the sample rate is 1 kHz and the predetermined number of samples of which the squared value is being summed is 10, then the detection delay 59, which substantially corresponds to the quotient of said predetermined number of consecutive samples and said predetermined sample rate, will be about 10/1 kHz=10 ms. In this way the combination of the sample rate and this predetermined number of consecutive samples can be chosen in function of a predetermined maximum detection delay which still allows for timely intervention in the operation of the harvesting machine 1 in order to avoid damage by a foreign object.

The impact of foreign objects generate acceleration signals as measured by the vibration sensor 20 with as characteristics a main frequency component in the range of 80 Hz to 200 Hz, for example 120 Hz. The acceleration signals are further largely sinusoidal in shape, which means that the vibrations manifest themselves at the location of the vibration sensor 20 as a sequence of acceleration phases immediately followed by similar deceleration phases in contrast to disturbance spikes which typically result in only a positive or negative specific deflection of the signal. As clearly shown in FIG. 6, squaring the sampled signal and subsequently summing a predetermined number of consecutive squared samples results in a clear discrimination of the signal generated by an impact of a foreign object versus a spike in the signal generated by a disturbance. Although it is possible to try out several combinations of sampling rate and predetermined number of consecutive samples in order to determine the ones that maximize the summed, squared sampled signal 58 generated by the collision of the foreign object, choosing the predetermined number of samples can be performed in a simple way for a specific sampling rate if the main frequency component of the signal generated by the collision of a foreign object is known. For example as when the sampling rate is 1 kHz and the main frequency component is 120 Hz, this predetermined number of samples can be chosen to be equal to about the main frequency component of said signal generated by said collision of said foreign object divided by said predetermined sampling rate, which is in this particular case 120 Hz/1 kHz which results in about 9 samples.

In order to further enhance the reliability of the detection device according to an embodiment of the invention the predetermined threshold 65 could be manually adjusted by an operator to be able to cope with varying harvesting conditions. Alternatively the control system 50 could also be configured to receive an operating parameter of the harvesting machine 1; such as for example the rotational speed of the feed roll, the type of crop being harvested, installed components on the harvesting machine, such as for example the type of header used, the number and type of knives installed on the cutter drum of a forage harvester, the cutting length for the crop when harvested by a forage harvester, harvesting conditions, etc. so that this predetermined threshold can be set to a value that allows the most reliable detection of a foreign object in the specific situation.

When a vibration sensor 20 is mounted on the feed roll 32 in addition to the vibration sensor(s) on the shaft 34, this additional vibration sensor 20 rotates together with the feed roll 32. In such an embodiment the control system 50 comprises two parts. A first part 62 is also mounted on the feed roll 32 and comprises a wireless transmitter 63 configured to transmit a wireless signal generated on the basis of the signal generated by said vibration sensor 20. In order to provide power to this wireless transmitter the first part of the controls system comprises a local power source 64. A second part 66 of the control system 50 is mounted on the central shaft 34 and comprises a wireless receiver 67 configured to receive the wireless signal transmitted by the wireless transmitter. Multiple vibration sensors could be arranged on the feed roll 32, which could be distributed along the longitudinal axis or around the cylindrical circumference of the feed roll 32 in order to optimize detection of foreign object impacts along the entire circumference of the feed roll 32. Preferably the control system 50 converts the analog signal from the vibration sensor 20 to a suitable digital signal before wireless transmission, so that the quality of the signal is not degraded by the wireless transmission and a reliable detection is possible.

In order to limit power consumption and prolong the operational life of the local power source 64, which could for example be a suitable battery, the vibration sensor 20 is preferably a piezoelectric vibration sensor. Such piezoelectric vibration sensors, such as for example the known types of Bosch with reference number 0 261 231 196, are able to detect vibrations in the desired frequency range and are furthermore able to generate a signal without consuming power from a power source. In order to still further reduce power consumption from the local power source 64, the operation of the wireless transmitter 63 may be optimized by only generating the wireless signal when the first part 62 of the control system 50 detects a collision of said foreign object. In order to do so the processing of the signal 54 from the vibration sensor 20, this means, detecting when the summed, squared signal 58 exceeds the predetermined threshold 65 in order to produce a detection signal 52 must be executed locally in the first part 62 of the control system 50. In order to still further extend the operating life of the local power source 64, it can comprise a rechargeable power source, such as for example a rechargeable battery. This rechargeable power source can then be recharged by means of an inductive power coupling between the first part 62 and the second part 66 of the control system 50 as schematically illustrated.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A detection device for detection of a foreign object in an agricultural harvesting machine, the harvesting machine comprising a feed roll assembly with a central shaft and a feed roll rotatably mounted around the central shaft, the central shaft and the feed roll having a common rotational axis, the detection device comprising:
at least one directional vibration sensor for being mounted on the central shaft and configured to sense vibrations induced into the feed roll assembly; and
a control system operatively coupled to the at least one directional vibration sensor and configured to:
analyze a signal generated by the at least one directional vibration sensor by:
generating a sampled signal by sampling the signal generated by the at least one directional vibration sensor at a predetermined sample rate;
calculating a squared sampled signal as a square of the sampled signal; and
calculating a summed, squared sampled signal as a sum of a predetermined number of consecutive samples of the squared sampled signal; and
determine whether the foreign object has collided with the feed roll by generating a detection signal when the summed, squared sampled signal exceeds a predetermined threshold,
wherein the at least one directional vibration sensor is for being mounted to sense vibrations induced into the feed roll assembly in a direction transverse to the common rotational axis.

2. The detection device according to claim 1, wherein the at least one directional vibration sensor is for being mounted on the central shaft in between supports near axial extremities of the central shaft for mounting the feed roll assembly to the harvesting machine.

3. The detection device according to claim 1, wherein the predetermined sample rate and the predetermined number of consecutive samples are related to a predetermined maximum delay for detection, in such a way that a quotient of the predetermined number of consecutive samples and the predetermined sample rate substantially corresponds to the predetermined maximum delay for detection.

4. The detection device according to claim 1, wherein the predetermined sample rate and the predetermined number of consecutive samples are determined such that the summed, squared sampled signal generated by the collision of the foreign object is maximized.

5. The detection device according to claim 4, wherein the predetermined number of consecutive samples is generally equal to a main frequency component of the signal generated by the collision of the foreign object divided by the predetermined sample rate.

6. The detection device according to claim 1, wherein the control system is further configured to receive an operating parameter of the harvesting machine, and wherein the predetermined threshold is determined as a function of the operating parameter of the harvesting machine.

7. The detection device according to claim 6, wherein the operating parameter of the harvesting machine is at least one of the following:
rotational speed of the feed roll;
type of crop being harvested;
installed components on the harvesting machine; and
cutting length for the crop when harvested by a forage harvester.

8. The detection device according to claim 1, further comprising at least one additional sensor for being mounted on the feed roll; and
wherein the control system comprises:
a first part for being mounted on the feed roll and comprising:
a wireless transmitter configured to transmit a wireless signal generated by the control system on the basis of a signal generated by the at least one additional sensor, and
a local power source for providing power to the wireless transmitter, and
a second part for being mounted on the central shaft and comprising a wireless receiver configured to receive the wireless signal.

9. The detection device according to claim 8, wherein the wireless signal is generated when the control system detects the collision of the foreign object.

10. The detection device according to claim 8, wherein the local power source is a rechargeable power source and is configured to be recharged by a charger providing an inductive power coupling between the first part and the second part of the control system.

11. The detection device according to claim 1, wherein the at least one directional vibration sensor is a knock sensor.

12. An agricultural harvesting machine comprising:
a feed roll assembly comprising a central shaft and a feed roll rotatably mounted around the central shaft, the central shaft and the feed roll having a common rotational axis; and
a detection device for detection of a foreign object, the detection device comprising:
at least one directional vibration sensor mounted on the central shaft of the feed roll assembly and configured to sense vibrations induced into the feed roll assembly; and
a control system operatively coupled to the at least one directional vibration sensor and configured to:
analyze a signal generated by the at least one directional vibration sensor by:
generating a sampled signal by sampling the signal generated by the at least one directional vibration sensor at a predetermined sample rate;
calculating a squared sampled signal as a square of the sampled signal; and
calculating a summed, squared sampled signal as a sum of a predetermined number of consecutive samples of the squared sampled signal; and
determine whether the foreign object has collided with the feed roll by generating a detection signal when the summed, squared sampled signal exceeds a predetermined threshold,
wherein the at least one directional vibration sensor is mounted to sense vibrations induced into the feed roll assembly in a direction transverse to the common rotational axis.

13. The agricultural harvesting machine of claim 12, wherein the central shaft near its axial extremities comprises two supports mounting the feed roll assembly to the harvesting machine, and wherein the at least one directional vibration sensor is mounted on the central shaft in between the two supports.

14. The agricultural harvesting machine of claim 12, wherein the predetermined sample rate and the predetermined number of consecutive samples are related to a predetermined maximum delay for detection, in such a way that a quotient of the predetermined number of consecutive samples and the predetermined sample rate substantially corresponds to the predetermined maximum delay for detection.

15. The agricultural harvesting machine of claim 12, wherein the predetermined sample rate and the predetermined number of consecutive samples are determined such that a summed, squared sampled signal generated by the collision of the foreign object is maximized.

16. The agricultural harvesting machine of claim 15, wherein the predetermined number of consecutive samples is generally equal to a main frequency component of the signal generated by the collision of the foreign object divided by the predetermined sample rate.

17. The agricultural harvesting machine of claim 12, wherein the control system is further configured to receive an operating parameter of the harvesting machine, and wherein the predetermined threshold is determined as a function of the operating parameter of the harvesting machine.

18. The agricultural harvesting machine of claim 12, wherein the detection device further comprises at least one additional directional sensor mounted on an inside of the feed roll, and wherein the control system comprises:
    a first part mounted on the feed roll and comprising:
        a wireless transmitter configured to transmit a wireless signal generated by the control system on the basis of a signal generated by the at least one additional directional sensor, and
        a local power source for providing power to the wireless transmitter, and
    a second part mounted on the central shaft and comprising a wireless receiver configured to receive the wireless signal.

\* \* \* \* \*